US006947649B2

(12) United States Patent
Li et al.

(10) Patent No.: US 6,947,649 B2
(45) Date of Patent: Sep. 20, 2005

(54) METHOD OF ADJUSTING THE INDEX OF REFRACTION OF PHOTONIC CRYSTALS WITH LASER MICROMACHINING TO TUNE TRANSMISSIONS WITHIN THE BANDGAP AND STRUCTURE

(75) Inventors: Ming Li, Chelmsford, MA (US); Makoto Ishizuka, Belmont, MA (US); Xinbing Liu, Acton, MA (US); Daniel Hogan, Acton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 290 days.

(21) Appl. No.: 10/329,186

(22) Filed: Dec. 24, 2002

(65) Prior Publication Data

US 2003/0223720 A1 Dec. 4, 2003

Related U.S. Application Data

(60) Provisional application No. 60/384,576, filed on May 31, 2002.

(51) Int. Cl.$^7$ .............................. G02B 6/00; H04J 14/08
(52) U.S. Cl. ........................ 385/122; 385/129; 385/130; 385/131; 385/132; 385/141; 385/14; 398/98; 398/101; 398/102
(58) Field of Search ......................... 385/14, 122, 129, 385/130, 131, 132, 141, 123; 398/79, 81, 98, 101, 102

(56) References Cited

U.S. PATENT DOCUMENTS

| 5,802,236 | A  | * | 9/1998  | DiGiovanni et al. ........ 385/127 |
|-----------|----|---|---------|------------------------------------|
| 5,881,186 | A  |   | 3/1999  | Starodubov ................... 385/37 |
| 6,075,915 | A  | * | 6/2000  | Koops et al. ............... 385/125 |
| 6,347,171 | B1 |   | 2/2002  | Tatah et al. ................... 385/37 |
| 6,542,682 | B2 |   | 4/2003  | Cotteverte et al. .......... 385/125 |
| 6,597,721 | B1 | * | 7/2003  | Hutchinson et al. .......... 372/98 |
| 6,640,034 | B1 | * | 10/2003 | Charlton et al. ............ 385/122 |
| 6,687,447 | B2 | * | 2/2004  | Flory et al. ................. 385/129 |
| 2003/0072519 | A1 |   | 4/2003  | Bolanos ....................... 385/16 |
| 2003/0123827 | A1 |   | 7/2003  | Salerno et al. .............. 385/129 |
| 2003/0202728 | A1 |   | 10/2003 | Leonard et al. |
| 2003/0223720 | A1 | * | 12/2003 | Li et al. ..................... 385/129 |
| 2003/0231822 | A1 | * | 12/2003 | Li et al. ...................... 385/24 |
| 2004/0062505 | A1 |   | 4/2004  | Sugitatsu et al. ........... 385/131 |

OTHER PUBLICATIONS

M. Li and X. Liu; "IR and UV Femtosecond Laser Micromachining of Si–on–SiO$_2$ for Photonic Bandgap Crystal Fabrication"; Mat. Res. Soc. Symp. Proc. vol. 637; pp. E5.8.1–E5.8.5; 2001.

S. Chu et al., "Wavelength Trimming of a Microring Resonator Filter by Means of a UV Sensitive Polymer Overlay"; IEEE Photonics Technology Letters, vol. 11, No. 6; Jun. 1999; pp. 688–690.

Xinging Liu and Gerard Mourou; "Ultrashort Laser Pulses Tackle Precision Machining"; Laser Focus World; Aug. 1997.

Ming Li et al.; "Nanostructuring in submicron–level waveguides with femtosecond laser pulses"; Optics Communications; Sep. 2002.

L. Huang et al.; "GaAs under Ultrafaxt Excitation: Response of te Dielectric Function"; Phys. Rev. Lett. 80, pp. 185–188; 1998.

* cited by examiner

*Primary Examiner*—Brian M. Healy
(74) *Attorney, Agent, or Firm*—RatnerPrestia (57) ABSTRACT

A photonic crystal comprising a waveguide made of material. The waveguide has a periodic set of holes. The material proximate to at least one of the holes in the periodic set of holes exhibits an index of refraction that has been modified by the application of laser energy relative to the material proximate to other holes in the periodic set of holes.

26 Claims, 5 Drawing Sheets

FIG. 6

METHOD OF ADJUSTING THE INDEX OF REFRACTION OF PHOTONIC CRYSTALS WITH LASER MICROMACHINING TO TUNE TRANSMISSIONS WITHIN THE BANDGAP AND STRUCTURE

CROSS REFERENCE TO RELATED APPLICATION

This application claims the benefit under Title 35 U.S.C. §119(e) of U.S. Provisional Application No. 60/384,576 filed on May 31, 2002, the contents of which are incorporated herein by reference.

FIELD OF THE INVENTION

The present invention relates to photonic crystals. More particularly, it relates to photonic crystals that use destructive interference to restrict the propagation of particular wavelengths of light and that use constructive interference to permit the propagation of particular wavelengths of light, and methods for tuning the photonic crystals to adjust the wavelength at which constructive interference occurs.

BACKGROUND OF THE INVENTION

As technology advances, the volume of data around the world is growing at an exponential rate. Everything from increased usage of the global information networks (e.g. the Internet), video conferences, and mobile phones relies on efficient data transfer. Reductions in the distance that electrons need to travel within and between components have provided the dramatic increases in device speeds. Increases in the speed of electronic devices through the 1980s and 1990s largely resulted from reductions in size of microelectronic components. However, microelectronics communications networks have physical limitations that effectively limit the volume of data that can be transferred. As devices encroach upon the physical limits of component density and complexity, device reliability and speed advances for new devices are declining.

Optical communication of data (e.g., sending photons through optical fiber, rather than sending electrons through wire) is already widely implemented for certain connections and communications. Optical connections, optical switching, and all-optical circuits provide ways for photons to travel and be routed, in place of electrons traveling through electronic circuits. Wavelength division multiplexing (WDM) provides a way to send even more data through optical components (such as fiber) by mixing light of different wavelengths in the same fiber. A demultiplexer separates a specific wavelength of light from a fiber. Time division multiplexing (TDM) provides another way to send data through optical components. In TDM, bits associated with different channels are interleaved in the time domain to form a composite bit stream. A TDM demultiplexer separates the channels by providing a set of gates which allow the interleaved portions of the optical signal representing the channels to be coupled into separate, single channel fibers in response to a clock signal. TDM demultiplexing requires a clock signal and the ability to provide specific time delays to the clock signal.

Photonic devices and microphotonics provide significant potential for furthering the advancement of technology devices historically served by microelectronics because they also enable large volumes of data to travel along optical fibers and be routed to their final destinations. A primary reason that all-optical circuits have not yet been implemented is that there are manufacturing problems related to photonic device fabrication, such as meeting index of refraction specifications. The small feature size required for photonic devices, as well as small tolerances for physical specifications of photonic devices, have delayed the discovery and use of mass manufacturing techniques for these devices.

Photonic crystals are structures that restrict the propagation of particular wavelengths by the use of destructive interference and can be designed for very complex routing of light. While optical fiber cannot effectively route light through sharp 90-degree turns, or through complex three-dimensional devices, photonic crystals can be used for these purposes. Photonic devices in general and photonic crystals in particular are applicable to lasers, filters and light-emitting diodes and are also applicable in WDM (wavelength division multiplexing) applications. In WDM, light of many different wavelengths travels along an optical fiber and the different wavelengths of light have different destinations.

A photonic crystal may be used for a specific application which benefits from design control of the bandgap, those wavelengths that are "forbidden" (do not pass through the structure) and/or the narrow band of transmitted wavelengths within the "forbidden" range of wavelengths.

Photonic crystals may be 1D (one dimension), 2D (two dimension) or 3D (three dimension) periodic structures. Such periodic structures may comprise periodic holes, periodic posts, or the periodic occurrence of a particular index of refraction. Periodicity distinguishes periodic photonic crystals from other photonic devices. When the product of the lattice constant (pitch) and the index of refraction is on the order of the wavelength of the light traveling in the structures, photonic crystals usually demonstrate some unique characteristics. For example, some wavelengths are strongly enhanced and some wavelengths are strongly suppressed. These characteristics can be used to manipulate light.

One kind of photonic crystal is a photonic bandgap crystal in which light at specific "forbidden" wavelengths (those wavelengths within the photonic bandgap) are rejected by the photonic crystal. The introduction of a defect into a photonic bandgap crystal creates a narrow transmission peak where a specific, narrow band of wavelengths of light within the bandgap range is allowed to propagate while all other wavelengths within the photonic bandgap are forbidden. As the light travels through the photonic bandgap crystal, the light in the desired band of wavelengths is transmitted by the photonic crystal and routed to its destination. The range of wavelengths that do not pass through the photonic bandgap crystal may be relatively broad, for example 1300 $\mu$m–1700 $\mu$m, while the band of passed wavelengths may be relatively narrow, for example, 1625 $\mu$m–1650 $\mu$m.

Photonic devices are fabricated using the known methods of x-ray or optical lithography. X-ray and optical lithography allow manufacturers of those devices to create very small feature sizes. Currently, photonic crystals are commonly manufactured using GaAs and GaAlAs or layered Si and $SiO_2$. Alternatively, any solid-state material may be used as a photonic crystal as long as it has low absorption of the wavelength traveling in it.

SUMMARY OF THE INVENTION

The invention is embodied in a photonic crystal comprising a waveguide made of material. The material may be a crystalline material, a dielectric material, or other material that is light transmissive. The waveguide has a periodic set of holes that defines a stopband for light that is forbidden from being transmitted through the photonic crystal and a defect in the periodic set of holes that defines a passband for light within the stopband that is transmitted through the photonic crystal. The material proximate to at least one of the holes in the periodic set of holes exhibits an index of refraction that has been modified by the application of laser energy, relative to the material proximate to other holes in the periodic set of holes to change the passband.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention provides a way to adjust the index of refraction of a photonic crystal for use in photonic devices. The photonic crystal may be made from a crystalline material, a dielectric material, or other material that is light transmissive. The index of refraction is related to the molecular structure of a material and thus directs the behavior of light within that material. Therefore, adjustments to material properties of a photonic crystal also adjust its index of refraction, resulting in an effect on the behavior of light in the photonic crystal.

The index of refraction of a photonic crystal may be precisely tuned so that the selected wavelength, or wavelengths, are either forbidden or transmitted. As described below, the index of refraction of material from which the photonic crystals are made may be accurately and precisely adjusted. Furthermore, a variation in the physical dimensions of a photonic crystal may be used to alter the bandgap and/or defect state(s), altering the transmission through the structure. A defect may be, for example, a break in periodicity of holes in the photonic crystal such as a missing hole.

Laser tuning of photonic crystals is preferred because the feature sizes of photonic crystals for the 1.55 micron telecommunication wavelength are very small and are usually measured in nanometers. It is difficult, however, to achieve design specifications of photonic crystals using conventional MEMS technologies. The tuning capabilities of a laser are desirable to meet these specifications. Current mass manufacturing methods for photonic crystals do not provide the required control of manufacturing specifications to produce a structure tuned to the correct wavelength. What is needed is a way to mass manufacture a photonic crystal within specifications. What is also needed is a way to precisely adjust the index of refraction of a photonic crystal to produce constructive interference at a target wavelength.

Figures 1, 2A:
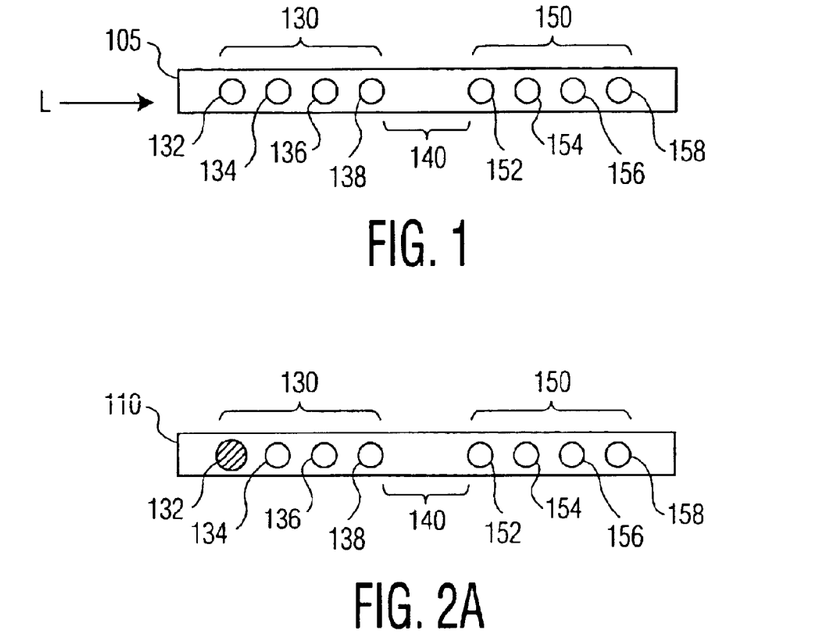
FIG. 1 is a block diagram of a prior art photonic crystal having two periodic sets of holes separated by a defect region.
FIG. 2A is a block diagram of a photonic crystal having two periodic sets of holes separated by a defect region wherein the first hole has been enlarged.

FIG. 1 is a block diagram of a prior art photonic crystal 105 used as a waveguide for light. Photonic crystal 105 is a conventional structure for manipulating the flow of laser light. It is a one-dimensional structure of Si-on-SiO$_2$. While exemplary embodiments of the invention are shown and described herein, it will be understood that such embodiments are provided by way of example only. Numerous variations, changes and substitutions will occur to those skilled in the art without departing from the invention. Light may traverse the photonic crystal waveguide from left to right as shown by arrow L in FIG. 1. It will be understood that light may also traverse the photonic crystal from right to left. Photonic crystal 105 has a first linear periodic set of holes 130 and a second linear periodic set of holes 150. The first linear periodic set of holes 130 has four holes, 132, 134, 136, and 138. The second linear periodic set of holes 150 has four holes, 152, 154, 156, and 158. Between the last hole 138 in the first periodic set of holes 130 and the beginning hole 152 in the second periodic set of holes 150 is a break in the periodic nature of the two sets of holes. The break constitutes a linear defect region 140.

In this prior art photonic crystal, each of the holes in each periodic set of holes may be formed using femtosecond laser pulses with a wavelength of 775 nm. In an alternative prior art embodiment, each of the holes may be formed using femtosecond laser pulses with a wavelength of 387 nm. When 387 nm laser light is used, holes may be obtained as small as 160 nm in diameter and the pitch (the distance between the centers of adjacent holes) may be 420 nm.

In operation, light is introduced into one end of photonic crystal 105. As the light propagates through photonic crystal 105, defect region 140 allows a specific band of wavelengths to pass through photonic crystal 105 while other wavelengths within the photonic bandgap are precluded from passing through. In an exemplary embodiment of the prior art, photonic crystal 105 may allow light in a narrow band centered around a wavelength of 1.650 $\mu$m to pass through. Destructive interference prevents other wavelengths within the bandgap from flowing through photonic crystal 105 by allowing the other wavelengths to be scattered. Each of the holes are scattering centers. Only a narrow band centered around a particular wavelength can scatter off the holes and have constructive interference at the output. In the exemplary embodiment of the prior art, the center wavelength may be 1.650 $\mu$m and the narrow band may be about 1.640 $\mu$m to about 1.660 $\mu$m or from about 1.645 $\mu$m to about 1.655 $\mu$m.

FIG. 2A is a block diagram of an exemplary embodiment of a photonic crystal 110 according to the present invention, having two periodic sets of holes separated by a defect region wherein the first hole 132 has been enlarged. Enlarged hole 132 may have been enlarged by laser micromachining. The placement of enlarged hole 132 in photonic crystal 110 affects both the transmission efficiency, the frequency of light passed by the photonic crystal 110, and also the wavelength that is passed. The placement of the enlarged hole causes a measurable change in the transmission efficiency and the wavelength, in nanometers, of light passed through the photonic crystal 110. The measurable change is caused because the enlarged hole impacts the interference with light waves passing through photonic crystal 110.

Hole 132 in photonic crystal 110 may be enlarged in two different ways. Before describing those ways, we will first explain the relationship between the application of various amounts of laser energy to a photonic crystal and changes in the nature of the area of the photonic crystal that is impacted by the application of the laser energy.

The inventors have determined that laser energy may be used to adjust the index of refraction of a photonic crystal. Intense femtosecond laser pulses excite the dense electron-hole plasma in a semiconductor, which causes changes in band structure and can lead to structural transitions. A dielectric such as GaAs may be subjected to various levels of laser energy. Studies of the impact of various levels of laser energy on a GaAs dielectric show that the fluence threshold for permanent damage to the dielectric, $F_{th}$, is 1.0 kJ/m$^2$. That is, permanent damage is caused to a dielectric when laser energy equal to or above the threshold level $F_{th}$ is applied to the dielectric. Other levels of laser energy result in different effects upon the dielectric. For example, laser energy substantially above $F_{th}$ results in vaporizing the dielectric material, thereby leaving a hole in place of the vaporized material.

Returning to FIG. 2A, hole 132 may be enlarged by applying laser energy directly at hole 132 of photonic crystal 110 and an area of photonic crystal 110 proximate to hole 132. The first type of enlargement may be accomplished by applying an amount of laser energy that is at or above the threshold level of energy, $F_{th}$, of the dielectric comprising the photonic crystal but below the ablation threshold $A_{th}$. Application of laser energy at or above $F_{th}$, but below $A_{th}$ permanently damages the dielectric proximate to hole 132 without vaporizing the damaged dielectric. Application of the threshold level of energy to hole 132 results in the formation of an annulus of damaged dielectric material around the outside of hole 132. Since the annulus is formed around the outside of hole 132, the diameter of the annulus is greater than the diameter of hole 132. In an exemplary embodiment, the diameter of the annulus is in a range of about 1% to about 5% larger than the diameter of hole 132.

Before the threshold level of energy, $F_{th}$, is applied to hole 132, the index of refraction proximate to hole 132 is the index of refraction of the material from which the photonic crystal is made. As a result of the application of energy at or above $F_{th}$, the molecular structure of the annulus is permanently changed, thereby also permanently changing the index of refraction of the annulus. Consequently, the material other than the annulus exhibits a first molecular structure (e.g. crystal) and a first index of refraction while the material of the annulus exhibits a second molecular structure (e.g. glass) and a second index of refraction. In fact, as a result of applying laser energy at $F_{th}$ to hole 132, the exemplary material comprising the annulus may be changed to amorphous glass.

The second type of enlargement that may be applied to hole 132 is the application of laser energy that is equal to or in excess of the ablation threshold level of energy, $A_{th}$. When such a high level of laser energy is applied to hole 132, hole 132 is enlarged because an annulus shaped portion of material is ablated (removed), thereby increasing the diameter of hole 132. In an exemplary embodiment, the diameter of the removed material is in a range of about 1% to about 5% larger than the diameter of hole 132.

This modification of hole 132 therefore also results from the application of laser energy and causes the transmitted wavelength of light to change. In addition, this type of modification can also be thought of as a modification of the index of refraction of the annular area proximate to hole 132. Before the application of laser energy, the index of refraction of the material proximate to hole 132 exhibited a first index of refraction. After the application of laser energy in excess of $A_{th}$, the index of refraction of the enlarged portion (where material had previously been present) changed from the index of refraction of the material to the index of refraction of the ambient atmosphere.

Regardless of how the enlargement of hole 132 is accomplished, the specific narrow wavelength band that may be passed by photonic crystal 110 will be different from the narrow wavelength band that may be passed by photonic crystal 105.

Figure 2B:
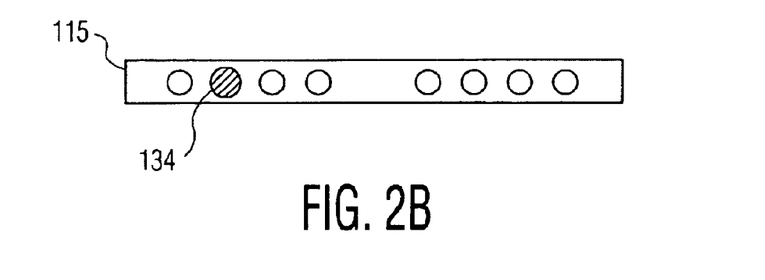
FIG. 2B is a block diagram of a photonic crystal having two periodic sets of holes separated by a defect region wherein the second hole has been enlarged.
Figure 2C:
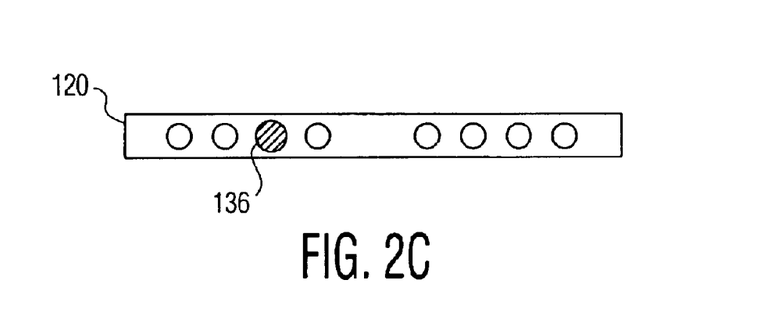
FIG. 2C is a block diagram of a photonic crystal having two periodic sets of holes separated by a defect region wherein the third hole has been enlarged.
Figure 2D:
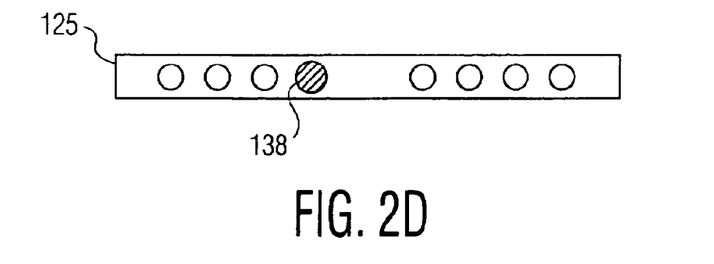
FIG. 2D is a block diagram of a photonic crystal having two periodic sets of holes separated by a defect region wherein the fourth hole has been enlarged.

FIGS. 2B, 2C, and 2D show other embodiments of photonic crystals that have been structurally modified. Each modification results in the respective photonic crystal being tuned to allow transmission of a different narrow wavelength band than the other embodiments. As shown in FIG. 2B, for example, hole 134 may be modified by application of laser light in the same manner as hole 132 in FIG. 2A had been modified. Whereas hole 132 in photonic crystal 110 was the hole at the extreme left of the periodic set of holes 130, hole 134 is the second hole, counting from the left, in periodic set of holes 130. Hole 134 and the dielectric material proximate to hole 134 may be modified by application of laser light at or above $F_{th}$.but below $A_{th}$. After the application of that level of laser light, an annulus is formed around hole 134 having a lattice structure and an index of refraction that has been modified by the application of the laser energy. In an exemplary embodiment, the diameter of the annulus may be in a range of about 1% to about 5% larger than the diameter of hole 134. Alternatively, laser light may be applied to hole 134 that exceeds $A_{th}$. When that amount of laser energy is applied, a portion of the material proximate to and surrounding hole 134 is ablated, again changing the index of refraction and, as a result, the narrow wavelength band of the light that may be transmitted by the photonic crystal.

FIGS. 2C and 2D show embodiments in which holes 136 and 138, respectively, may be modified by application of laser light in either of the ways previously explained with respect to FIGS. 2A and 2B. As before, these modifications change the lattice structure, and/or index of refraction, and, thus, the narrow wavelength band of transmitted light.

In the embodiments shown in FIGS. 2A through 2D, modifications were made to a single hole in the waveguide. In other embodiments, modifications may be made to multiple holes in the waveguide. For example, in FIG. 2A, a modification may be made to hole 134 in addition to a modification to hole 132. In one modified embodiment, an annulus may be formed around hole 134 in addition to an annulus formed around hole 132 or in addition to an ablation of hole 132. In another modified embodiment, an ablation may be created around hole 134 in addition to an annulus formed around hole 132 or in addition to an ablation of hole 132. Similar modified embodiments may be made with respect to the embodiments shown in FIGS. 2B through 2I.

Figure 3:
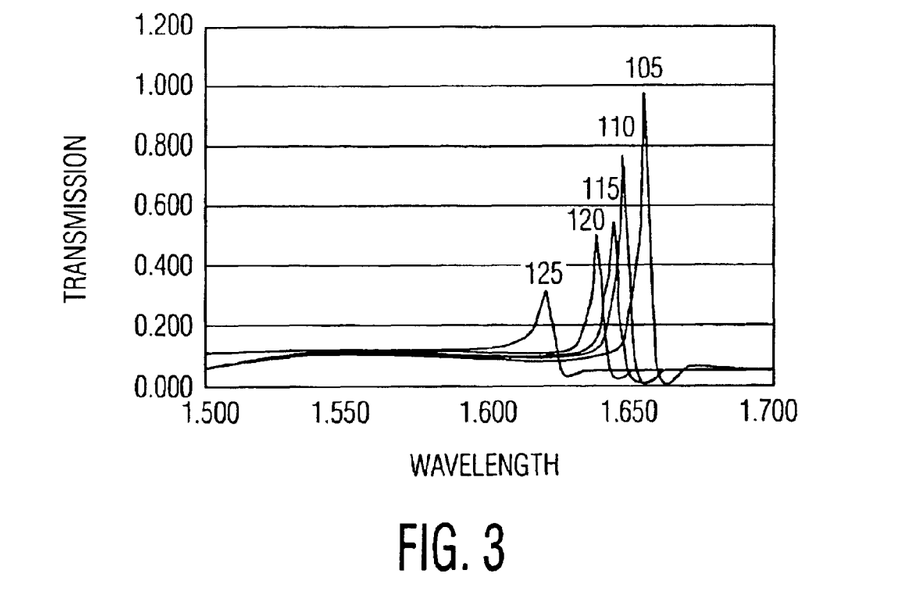
FIG. 3 is a graph showing the effect on transmitted wavelengths of light caused by having the different enlarged holes shown in FIGS. 2A, 2B, 2C, and 2D.

In addition to changing the wavelength of light transmitted in photonic crystals when holes are enlarged, the placement of enlarged holes has an effect on transmission efficiency which is proportional to finesse of the device which is proportional to the quality or Q of the filter. The results of changing the placement of an enlarged hole in a photonic crystal are shown in FIG. 3. FIG. 3 shows that changes in the placement of an enlarged hole in a photonic crystal causes measurable changes in the transmission efficiency, as well as in the wavelength, of the transmitted light. Graph 105 in FIG. 3 shows that photonic crystal 105 transmits light having a 1.650 μm wavelength with 1.0 efficiency. Graph 110 shows that photonic crystal 110, with enlarged hole 132, transmits light having a wavelength of about 1.642 μm with less than 0.8 efficiency. Graph 115 shows that photonic crystal 115, with enlarged hole 134, transmits light having a wavelength of about 1.640 μm with less than 0.6 efficiency. Graph 120 shows that photonic crystal 120, with enlarged hole 136, transmits light having a wavelength of about 1.632 μm with approximately 0.5 efficiency. Graph 125 shows that photonic crystal 125, with enlarged hole 138, transmits light having a wavelength of about 1.616 μm with less than 0.4 efficiency.

Figure 2E:
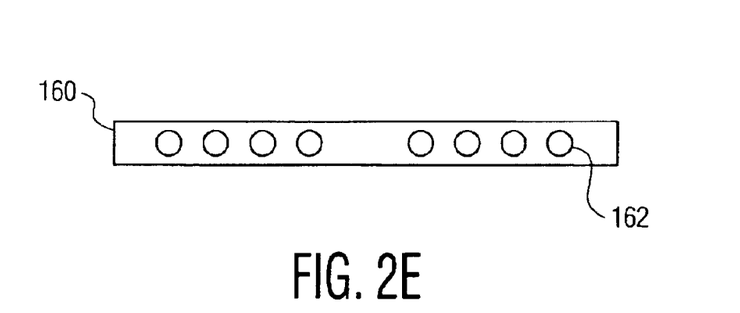
FIG. 2E is a block diagram of a photonic crystal having two periodic sets of holes separated by a defect region wherein one of the periodic sets of holes has more holes than the other periodic set of holes.

FIG. 2E is a block diagram of yet another embodiment of the invention. It shows a photonic crystal 160 with two linear periodic sets of holes. One of the periodic sets of holes has four holes and the second set of the periodic sets of holes has a fifth hole 162. The addition of an extra hole changes the index of refraction of photonic crystal 160 and the wavelength of light transmitted by photonic crystal 160 as compared with the index of refraction and wavelength of light transmitted by photonic crystal 105. In a modified embodiment, one hole may be added to each end of the photonic crystal. This modified embodiment is shown in FIG. 2H where photonic crystal 165 contains the two periodic sets of holes with additional holes 162 and 164 added to the ends of the photonic crystal.

Adding a hole at one end or a hole at both ends may make a large change. When holes are added symmetrically, at the same pitch as the other holes, to each end of the photonic crystal, the added holes may give better confinement of the light thereby increasing the efficiency of the photonic crystal and narrowing the range of the wavelengths that are transmitted within the bandgap. That is, the addition of one additional hole at each end of the photonic crystal increases the Q (the quality and the selectivity) of the filter implemented by the structure. Referring to graph 125 in FIG. 3, for example, the addition of a hole at each end of a photonic crystal may narrow the range of transmitted frequencies so that a graph of the band of transmitted wavelengths may have a transmission peak shape more like graphs 110, 115, or 120 than graph 125 without substantially changing the peak transmitted wavelength.

Figure 2F:
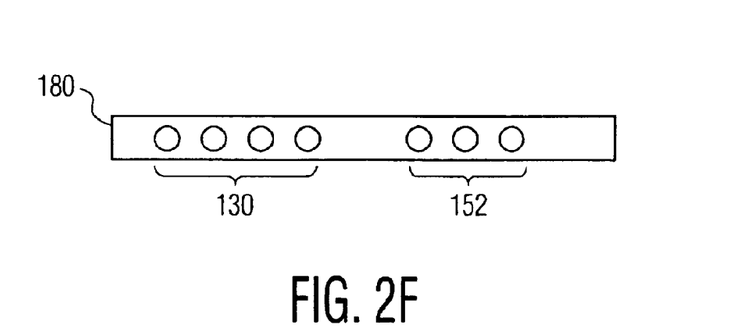
FIG. 2F is a block diagram of a photonic crystal having two periodic sets of holes separated by a defect region wherein one of the periodic sets has a fewer number of holes than the other set.

FIG. 2F is a block diagram of another embodiment of the invention. It shows a photonic crystal 180 with two linear periodic sets of holes. Periodic set of holes 130 has four holes and periodic set of holes 152 has three holes. Therefore, photonic crystal 180 depicts a photonic crystal 180 in which a hole has been removed. The removal of a hole from photonic crystal 105 depicted in FIG. 1, changes the index of refraction of photonic crystal 180 and the wavelength of light transmitted by photonic crystal 180 as compared with the index of refraction and wavelength of light transmitted by photonic crystal 105.

Figure 2G:
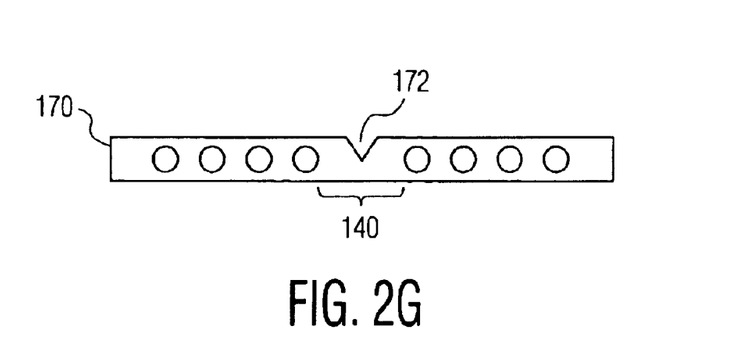
FIG. 2G is a block diagram of a photonic crystal having two periodic sets of holes separated by a defect region wherein there is a notch in the defect region.
Figure 2H:
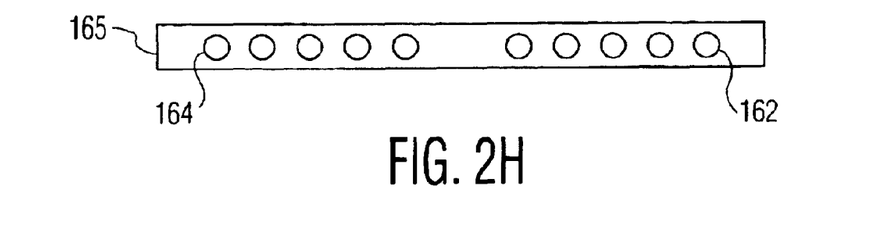
FIG. 2H is a block diagram of a photonic crystal having two periodic sets of holes separated by a defect region wherein an extra hole has been added at each end of the crystal.

FIG. 2G is a block diagram of another embodiment of the invention. It shows a photonic crystal 170 with two linear periodic sets of holes. In this embodiment, defect region 140 has been modified by forming a notch 172 in the surface of defect region 140 in proximity to one of the periodic sets of holes. The notch is formed by the application of laser energy to a portion of the surface of photonic crystal 170. Application of laser energy to form the notch 172 changes the index of refraction at the area of the notch and, therefore, changes the index of refraction of photonic crystal 170 as well as the wavelength of light transmitted by photonic crystal 170 as compared with the index of refraction and wavelength of light transmitted by photonic crystal 105. Again, one of the holes may be temporarily modified by the application of laser energy resulting in the same kinds of temporary changes.

Figure 2I:
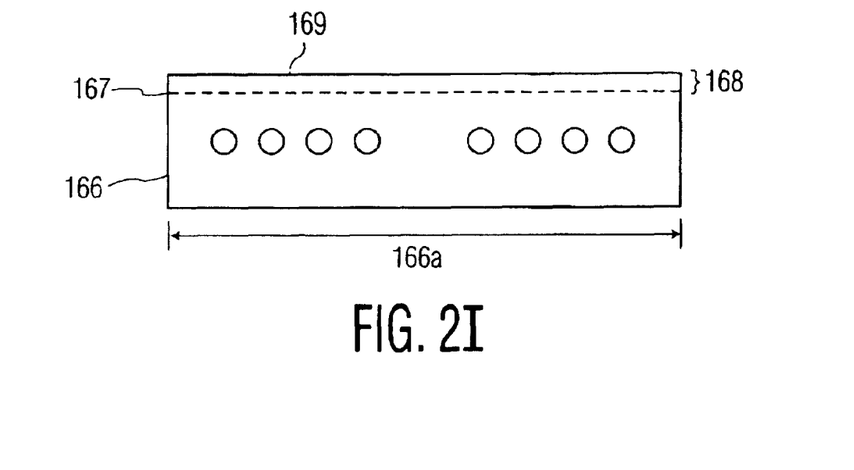
FIG. 2I is a block diagram of a photonic crystal having two periodic sets of holes separate by a defect region wherein a portion of the crystal has been trimmed along its entire width.

FIG. 2I shows another embodiment of a modified photonic crystal. Referring to FIG. 2I, the entire width of the photonic crystal may be trimmed instead of just making a notch as shown in FIG. 2G. For example, in photonic crystal 166 shown in FIG. 2I, the width of the crystal is designated as 166a. Dashed line 167 across width 166a and the area 168 between the edge 169 and the dashed line 167 shows an area of photonic crystal 166 that may be trimmed by the application of laser energy to the trimmed area. Trimming this area from the photonic crystal may modify the index of refraction of the trimmed area and, therefore, may also modify the wavelength that is transmitted.

In another embodiment, the structure and the index of refraction of an entire photonic crystal may be changed by passing laser light across the entire crystal resulting in a wavelength shifted, high Q filter. The method of passing laser light across the entire crystal may be applied to any of the photonic crystals discussed above: the photonic crystals shown in FIGS. 1 and 2A–2I. The method may also be applied to the photonic crystals shown in FIGS. 4 and 5 which are described below. Application of a sufficiently high amount of laser energy may, for example, change the structure of the entire photonic crystal to glass in one embodiment, or to metal, in another embodiment. After laser light is applied across an entire photonic crystal, the narrow band of wavelengths transmitted by the photonic crystal may be further modified in accordance with the teachings of the other embodiments. For example, one or more holes may be enlarged or an annulus may be created around one or more holes.

Figure 4:
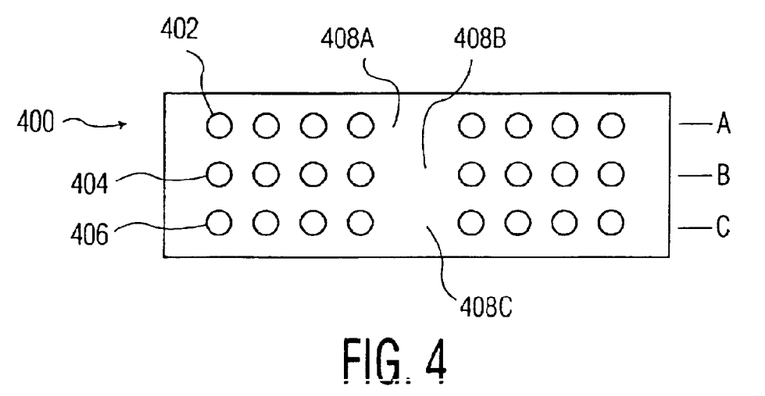
FIG. 4 is a block diagram of a photonic crystal having a plurality of rows of periodic sets of holes.

FIG. 4 is another embodiment of the invention. FIG. 4 depicts a two dimensional photonic crystal 400 having a plurality of holes arranged in rows A, B, C. The exemplary embodiment depicted in FIG. 4 shows three rows of holes. It will be understood that other embodiments of a two dimensional photonic crystal may have fewer rows or more rows. Each row of holes has two linear periodic sets of holes and a defect region between the two sets on each row. Row A has defect region 408A. Row B has defect region 408B. Row C has defect region 408C. In order to change the index of refraction of photonic crystal 400 and to change the narrow wavelength band of light that is transmitted by it, hole 402 may be modified by application of laser energy, or hole 404 may be modified by application of laser energy, or hole 406 may be modified by application of laser energy. In yet another embodiment, any two of holes 402, 404, or 406 may be modified. In still another embodiment, all three holes may be modified. In each case, the index of refraction of photonic crystal 400 may be changed in comparison to photonic crystal 400 without any enlarged holes. In other embodiments, modifications to additional holes may change the wavelength of light that is transmitted.

It will be understood that modification of hole 402 may modify the narrow transmitted wavelength band only for row A; that modification of hole 404 may modify the narrow transmitted wavelength band only for row B; and that modification of hole 406 may modify the narrow transmitted wavelength band only for row C.

Figure 5A:
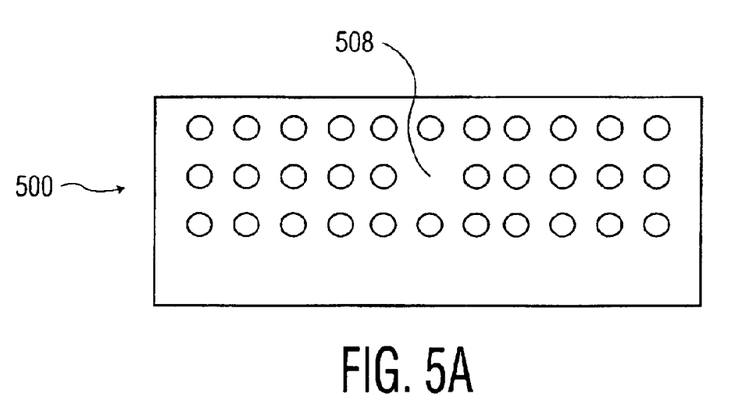
FIG. 5A is a block diagram of a photonic crystal having a plurality of rows of periodic sets of holes and a modified defect region.

FIG. 5A shows yet another embodiment of the invention. This embodiment shows a two dimensional photonic crystal having a plurality of linear periodic rows of holes and with a modified defect region 508. In this embodiment, only one row has a defect region 508 which is created by not forming a hole in the defect region. In this embodiment, none of the other rows of holes has a defect region. It will be understood that the embodiment shown in FIG. 5 may be further modified by any or all of the embodiments disclosed above. For example, an annulus may be formed around one or more of the holes. For another example, one or more of the holes may be ablated.

Figure 5B:
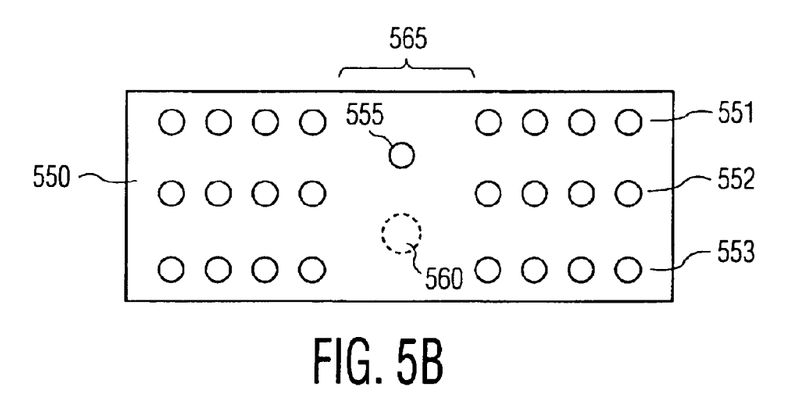
FIG. 5B is a block diagram of a photonic crystal having a plurality of rows of periodic sets of holes wherein one or more additional holes are added in an area that does not line up with any of the plurality of rows of periodic sets of holes.

FIG. 5B shows yet another embodiment of the invention. This embodiment shows another example of a two dimensional photonic crystal having a plurality of linear periodic rows of holes 551, 552, 553. In this embodiment, hole 555 may be added in a defect region 565 that exists generally between the various periodic rows of holes. Hole 555 may, however, be placed so that it does not line up with any of the holes in any of the periodic rows of holes 551, 552, 553. FIG. 5B shows an embodiment in which hole 555 may be placed in an area defined by defect region 565 and the space between rows 551 and 552. In an alternative embodiment, a hole may be placed in an area defined by defect region 565 and the space between rows 552 and 553. Such a hole is designated by dashed hole 553. In yet another embodiment, both of the holes 555 and 560 may be placed in the defect region. Furthermore, as explained above, any of the modifications described above may be made to any, or all, of the holes in the embodiments shown in FIG. 5B.

All of the embodiments described above have been designed to tune a photonic crystal to pass a narrow range of wavelengths in a bandgap. Each of the embodiments may also be used in connection with TDM (time division multiplexing). Referring, for example, to prior art FIG. 1, the time required for light to pass through a prior art crystal may be in the range of 9 to 11 picoseconds. The time for light to pass through the photonic crystal may be modified by tuning the crystal in accordance with the teachings of FIG. 2A. Accordingly, forming an annulus around hole 132 may modify the length of time required for light to pass through crystal 110. Ablating hole 132 may also modify the length of time. Those skilled in the art will recognize that a photonic crystal may be tuned in accordance with all of the embodiments disclosed in this application in order to tune the crystal to pass the light at different time delays, thereby providing for, desirably, precisely delayed signals which may be used as part of a TDM system.

Figure 6:
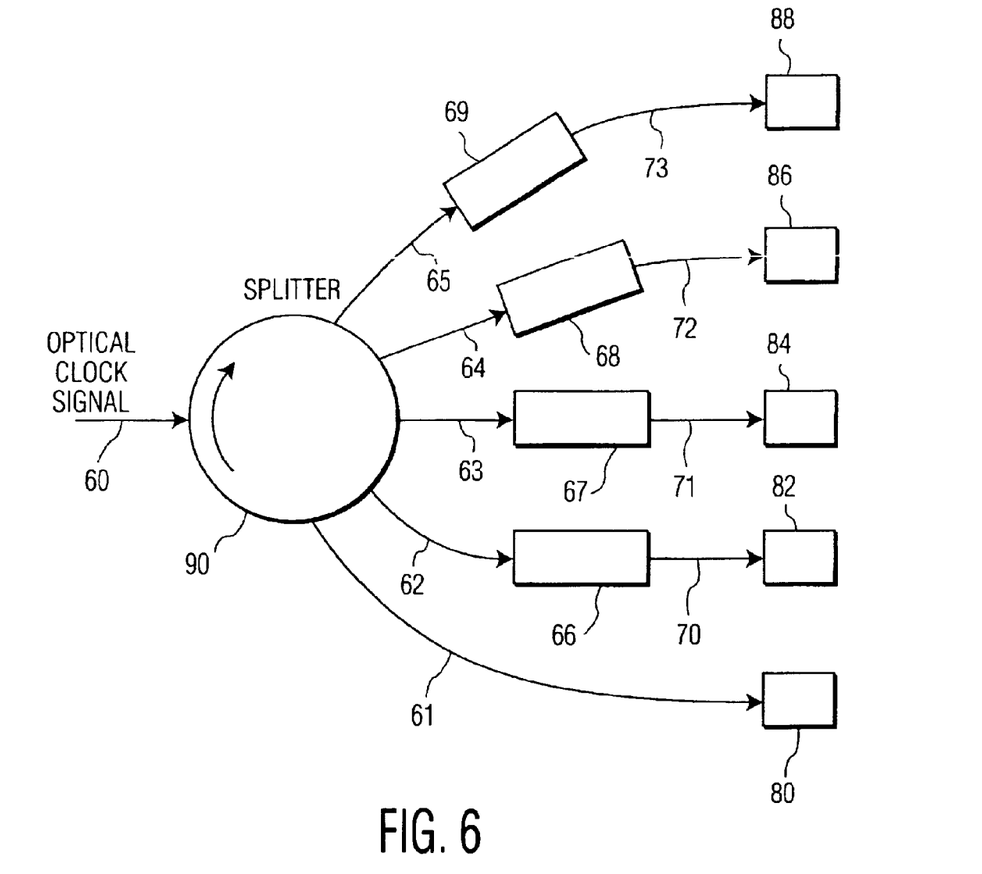
FIG. 6 is a block diagram of an exemplary embodiment of a device that may be used for optical TDM demultiplexing.

FIG. 6 is a block diagram of an exemplary embodiment of a device that may be used for optical TDM demultiplexing. Using this exemplary embodiment, a number of different, specific delays can be imposed upon a single clock signal to create a number of delayed clock signals which may be fed into different channels. In FIG. 6, a single optical clock signal 60 at one wavelength is incident upon wave splitter 90. Wave splitter 90 may be a cable spliced device or may be a star splitter, both of which are known to those skilled in the art. In the exemplary embodiment shown in FIG. 6, splitter 90 divides the clock signal into five different path, 61, 62, 63, 64, 65 all of which have the same wavelength. It will be understood by those skilled in the art that a splitter may create more or fewer than five clock signals. The clock signal in path 62 is incident upon photonic crystal 66; the clock signal in path 63 is incident upon photonic crystal 67; the clock signal in path 64 is incident upon photonic crystal 68; and the clock signal in path 65 is incident upon photonic crystal 69. The clock signal in path 61 is not incident upon a photonic crystal.

Each of the photonic crystals may be tuned by laser energy to delay the respective clock signal that is incident upon it. Each of the photonic crystals may be tuned differently so that each of them cause a different amount of delay from the other photonic crystals. In the exemplary embodiment, clock signal 61 may not be delayed. Instead, it may be transmitted, unmodified, to, for example, channel 1. Photonic crystal 66 may delay the clock signal along path 62 by a first amount of time. The first delayed clock signal exits photonic crystal 66 along path 70 and may be transmitted to, for example, channel 2. Photonic crystal 67 may delay the clock signal along path 71 by a second amount of time. The second delayed clock signal exits photonic crystal 67 along path 71 and may be transmitted to, for example, channel 3. Photonic crystal 68 may delay the clock signal along path 72 for a third amount of time. The third delayed clock signal exits photonic crystal 68 along path 72 and may be transmitted to, for example, channel 4. Photonic crystal 69 may delay the clock signal along path 73 for a fourth amount of time. The fourth delayed clock signal exits photonic crystal 69 along path 73 and may be transmitted to, for example, channel 5.

When splitter 90 is a star splitter, clock signal 60 may form clock signals 61, 62, 63, 64, and 65 simultaneously from respective output ports of splitter 90 because clock signal 60 may go to a central point within splitter 90 and may be dispersed simultaneously from the output ports along the various output paths in the same phase. When splitter 90 is a cable spliced device, however, clock signal 60 may exit from respective output ports of splitter 90 in different phases. For example, the clock signal along path 65 may exit first. Then, after a short delay, the clock signal may exit along path 64. After a further short delay, the clock signal may exit along path 63. Additional delays may be present for the clock signals exiting along paths 62 and 61. Therefore, when a cable spliced device is used for splitter 90, the tuning of each of the photonic crystals 66, 67, 68, 69 may be adjusted to compensate for the respective delays occasioned by splitter 90. Accordingly, photonic crystal 69 may be adjusted to provide the longest delay, photonic crystal 68 may be adjusted to provide a delay that is shorter than photonic crystal 69, photonic crystal 67 may be adjusted to provide a delay that is shorter than photonic crystal 68, and photonic crystal 66 may be adjusted to provide a delay that is shorter than photonic crystal 67. By adjusting the delays of the photonic crystals to compensate for the phase delays attributable to a cable spliced splitter, the clock signals being provided from the respective output ports of the photonic crystals may be able to follow a predetermined TDM sequence.

Each of the clock signals along paths 61, 70, 71, 72, 73 may be incident upon respective switching devices 80, 82, 84, 86, and 88 each of which, in an exemplary embodiment, may comprise a phototransistor coupled to an electroabsorption modulator. In another embodiment, each of the respective switching devices 80, 82, 84, 86, and 88 may be an optical transistor which is triggered by beams of light which turn the switch on or off.

Although the invention has been described in terms of exemplary embodiments, it is contemplated that it may be practiced as described above with variations within the scope of the appended claims.

What is claimed is:

1. A photonic crystal comprising a waveguide made of material, said waveguide having
    a periodic set of holes for defining a stopband for light;
    a defect in the periodic set of holes for defining a passband for light with the stopband;
    wherein the material proximate to at least one of the holes in the periodic set of holes exhibits an index of refraction that has been permanently modified by application of laser energy relative to the material proximate to other ones of the holes in the periodic set of holes.

2. A photonic crystal comprising a waveguide made of material, said waveguide having
    a periodic set of holes for defining a stopband for light;
    a defect in the periodic set of holes for defining a passband for light with the stopband;
    wherein the material in an annulus around at least one the holes in the periodic set of holes exhibits an index of refraction that has been modified by application of laser energy relative to the material proximate to other ones of the holes in the periodic set of holes.

3. The photonic crystal of claim 1, wherein the material is a dielectric material.

4. The photonic crystal of claim 1, wherein the material is a crystalline material.

5. The photonic crystal of claim 4, wherein the modified material proximate to the at least one of the holes comprises an annulus around the one of the holes.

6. The photonic crystal of claim 5, wherein the material of the waveguide exhibits a first lattice structure and the material forming the annulus exhibits a second lattice structure different from the first lattice structure.

7. The photonic crystal of claim 5, wherein a diameter of the annulus is in a range of about 1% to about 5% larger than a diameter of the holes.

8. The photonic crystal of claim 6, wherein the structure of the annulus is an amorphous structure.

9. The photonic crystal of claim 2, wherein a diameter of the annulus is in a range of about 1% to about 5% larger than a diameter of the holes.

10. The photonic crystal of claim 1, wherein the at least one of the holes has a first diameter that is larger than a diameter of any other hole in the periodic set of holes.

11. The photonic crystal of claim 10, wherein the first diameter is in a range of about 1% to about 5% larger than the diameter of any other hole in the periodic set of holes.

12. A photonic crystal comprising a waveguide made of material, said waveguide having
    a surface;
    a periodic set of holes; and
    a notch located in the surface of the waveguide proximate the periodic set of holes.

13. The photonic crystal of claim 12, wherein the molecular structure of the material proximate to the notch has been modified by application of laser energy relative to the molecular structure of other material of the waveguide.

14. A photonic crystal comprising a linear waveguide made of material, said waveguide having
    a first linear periodic set of holes;
    a second linear periodic set of holes;
    a linear region between the end of the first linear periodic set the of holes and the beginning of the second linear periodic set of holes,
    wherein the material proximate to at least one of the holes in one of the first and second periodic sets of holes exhibits an index of refraction that has been permanently modified by application of laser energy.

15. A photonic crystal comprising a waveguide made of material, said waveguide having:
    a plurality of rows of periodic sets of holes;
    wherein the material proximate to at least one of the holes in at least one row of the plurality of rows exhibits an index of refraction that has been permanently modified by application of laser energy relative to the material proximate to other ones of the holes in the at least one row.

16. The photonic crystal of claim 15, wherein the material proximate to the one of the holes in each row of the plurality of rows of holes exhibits an index of refraction that has been modified by application of laser energy.

17. A method of forming a photonic crystal comprising a waveguide made of material exhibiting an index of refraction, said method comprising the steps of:
    forming a periodic set of holes in the waveguide;
    permanently modifying the index of refraction of the material proximate to at least one of the holes in the periodic set of holes by applying laser energy to the material proximate to the at least one hole.

18. A method of forming a photonic crystal comprising a waveguide made of material exhibiting an index of refraction, said method comprising the steps of:
    forming a periodic set of holes in the waveguide;
    modifying the index of refraction of an annulus of the material around the at least one of the holes.

19. The method of claim 17, wherein the material is permanently changed by application of laser energy above an optical breakdown threshold level of laser energy and wherein the step of modifying the index of refraction of the crystalline material includes the step of applying laser energy in an amount that is about said breakdown threshold level.

20. The method of claim 17, wherein the material is permanently changed by application of laser energy above an optical breakdown threshold level of laser energy and wherein the step of modifying the index of refraction of the material includes the step of applying laser energy in an amount that exceeds said laser breakdown threshold level.

21. The method of claim 20 wherein the application of laser energy changes the material to glass phase.

22. The method of claim 17, further comprising the step of enlarging a diameter of the at least one of the holes, wherein the diameter is larger than a diameter of any other hole in the periodic set of holes.

23. A method of forming a photonic crystal comprising a waveguide made of material exhibiting an index of refraction, said method comprising the steps of:

forming a first linear periodic set of holes in the waveguide;

forming a second linear periodic set of holes in the waveguide, a linear defect region of the waveguide being between said first and second linear periodic sets of holes;

forming a further hole in the linear defect region of waveguide in addition to the first and second periodic sets of holes, wherein the further hole does not line up with either the first or second periodic set of holes.

24. A method of changing a wavelength of light transmitted by a waveguide of material, the method comprising the steps of forming a periodic set of holes in the waveguide;

permanently modifying the index of refraction of the material proximate to at least one of the holes in the periodic set of holes by applying laser energy to the material proximate to the at least one of the holes.

25. A method of changing a time delay of light transmitted by a waveguide made of material, the method comprising the steps of forming a periodic set of holes in the waveguide;

permanently modifying the index of refraction of the material proximate to at least one of the holes in the periodic set of holes by applying laser energy to the material proximate to the at least one of the holes.

26. A clock signal device for optical time division multiplexing a clock signal from a source of clock signals, said clock signal device comprising:

an optical splitter having an input for receiving the clock signal along a path, and a plurality of output ports for providing the clock signal along a plurality of paths from respective outputs of said optical splitter;

a plurality of photonic crystals, each of said photonic crystals having an input for receiving respective ones of the output ports from the optical splitter, wherein the molecular structure of each of the photonic crystals has been modified by application of laser energy.

* * * * *